United States Patent
Manley

(10) Patent No.: US 7,881,973 B2
(45) Date of Patent: Feb. 1, 2011

(54) METHOD, SYSTEM AND PROGRAM PRODUCT FOR SELECTING WINDOW COVERINGS

(75) Inventor: Monica P. Manley, Clifton Park, NY (US)

(73) Assignee: Enview Designs LLC, West Coxsackie, NY (US)

( * ) Notice: Subject to any disclaimer, the term of this patent is extended or adjusted under 35 U.S.C. 154(b) by 1008 days.

(21) Appl. No.: 11/679,327

(22) Filed: Feb. 27, 2007

(65) Prior Publication Data

US 2007/0244771 A1  Oct. 18, 2007

Related U.S. Application Data

(60) Provisional application No. 60/792,299, filed on Apr. 14, 2006.

(51) Int. Cl.
*G06Q 30/00* (2006.01)
(52) U.S. Cl. .......................... 705/26; 705/37
(58) Field of Classification Search .................. 705/26, 705/37
See application file for complete search history.

(56) References Cited

U.S. PATENT DOCUMENTS 6,922,701 B1   7/2005  Ananian et al.
7,210,587 B1 *  5/2007  Singer et al. .................. 211/55
2005/0144090 A1   6/2005  Gadamsetty et al.

OTHER PUBLICATIONS

Carol Tice, Web Ordering may alter role of distributors, National Home Center News, Jun. 22, 1998, 6 pages, downloaded from the Internet on Jan. 15, 2002.*

Caulfield, Ace Hardware stores to offer installation services, National Home Center News. New York: Jan. 8, 2001. vol. 27, Iss. 1; p. 4, downloaded from ProQuestDIrect on the Internet on May 10, 2010, 4 pages.*

PCT Application. International Search Report and Written Opinion. Int'l Appl. No. PCT/US 07/66219. Lee W. Young. Oct. 17, 2007.

* cited by examiner

*Primary Examiner*—James Zurita
(74) *Attorney, Agent, or Firm*—Hoffman Warnick LLC

(57) ABSTRACT

A solution for improving generally the selecting of window coverings, and more specifically, a method, system, and program product for selecting window coverings is provided. A method may include receiving at least one window attribute of a structure; obtaining a plurality of information via an electronic medium; and presenting at least one window covering option via the electronic medium, wherein the option is based on the at least one window attribute and the plurality of information.

25 Claims, 6 Drawing Sheets

METHOD, SYSTEM AND PROGRAM PRODUCT FOR SELECTING WINDOW COVERINGS

CROSS REFERENCE TO RELATED APPLICATIONS

This application claims the benefit of U.S. Provisional Application Ser. No. 60/792,299 filed on Apr. 14, 2006, and entitled "SYSTEM AND METHOD FOR SELECTION OF WINDOW COVERINGS", which is incorporated by reference herein in its entirety.

FIELD OF THE INVENTION

The present invention relates generally to window coverings, and more specifically relates to a method, system and program product for selecting window coverings.

BACKGROUND OF THE INVENTION

The current methodologies for selecting and pricing of window coverings (e.g., window treatments, curtains, valances, blinds, etc.) are confusing, complex, vague, and ambiguous to the owner, whether the methodology is employed during a new home (i.e., specification or custom home) construction process; during an addition or renovation project; or, during a cosmetic updating. Amongst other shortcomings, the current system is manufacturer-centric in that the window covering products provided to the home-owner for selection are entirely too voluminous and overwhelming in that there is no consideration given to numerous project and/or owner-specific variables (e.g., home type, location, budget, window type, architectural style, etc.). Furthermore, the custom window coverings pricing structure, as provided to the homeowner, is very complex and confusing; so that without the input of a window covering professional during the selection process, the pricing, and options, the process is devoid of any customized experience as related to the actual home being built, renovated, added to, and/or decorated, whether new or pre-existing.

Accordingly, a need exists for an improved system and method of providing information to a user (e.g., homeowner, consumer, etc.) for an improved window covering selection and pricing experience. In view of the foregoing, a need exists to overcome one or more of the deficiencies in the related art.

BRIEF SUMMARY OF THE INVENTION

The present invention includes a solution for improving generally the selecting of window coverings, and more specifically, a method, system, and program product for selecting window coverings is provided. A method may include receiving at least one window attribute of a structure; obtaining a plurality of information via an electronic medium; and presenting at least one window covering option via the electronic medium, wherein the option is based on the at least one window attribute and the plurality of information.

A first aspect of the present invention provides a method for selecting window coverings, comprising: receiving at least one window attribute of a structure; obtaining a plurality of information via an electronic medium; and presenting at least one window covering option via the electronic medium, wherein the option is based on the at least one window attribute and the plurality of information.

A second aspect of the present invention provides a system for selecting window coverings, comprising: a system for receiving at least one window attribute of a structure; a system for obtaining a plurality of information via an electronic medium; and a system for presenting at least one window covering option via the electronic medium, wherein the option is based on the at least one window attribute and the plurality of information.

A third aspect of the present invention provides a computer program stored on a computer-readable medium, which when executed, enables a computer system to provide a method for selecting window coverings, the computer program comprising program code for enabling the computer system to: receive at least one window attribute of a structure; obtain a plurality of information via an electronic medium; and present at least one window covering option via the electronic medium, wherein the option is based on the at least one window attribute and the plurality of information.

A fourth aspect of the present invention provides a method for generating a system for selecting a window covering, the method comprising: providing a computer infrastructure being operable to: receive at least one window attribute of a structure; obtain a plurality of information via an electronic medium; and present at least one window covering option via the electronic medium, wherein the option is based on the at least one window attribute and the plurality of information.

A fifth aspect of the invention provides computer software embodied in at least one propagated signal for window covering selection, the at least one propagated signal comprising instructions for causing at least one computer system to: receive at least one window attribute of a structure; obtain a plurality of information via an electronic medium; and present at least one window covering option via the electronic medium, wherein the option is based on the at least one window attribute and the plurality of information.

A sixth aspect of the present invention provides a data processing system for selecting window coverings comprising: a processing unit; a bus coupled to the processing unit; and a memory medium coupled to the bus comprising program code, which when executed by the processing unit causes the data processing system to: receive at least one window attribute of a structure; obtain a plurality of information via an electronic medium; and present at least one window covering option via the electronic medium, wherein the option is based on the at least one window attribute and the plurality of information.

A seventh aspect of the present invention provides a business method for selecting window coverings, the business method comprising: managing a network that includes at least one computer systems that performs the process described herein; and receiving payment based on the managing.

The illustrative aspects of the present invention are designed to solve one or more of the problems herein described and/or one ore more other problems not discussed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
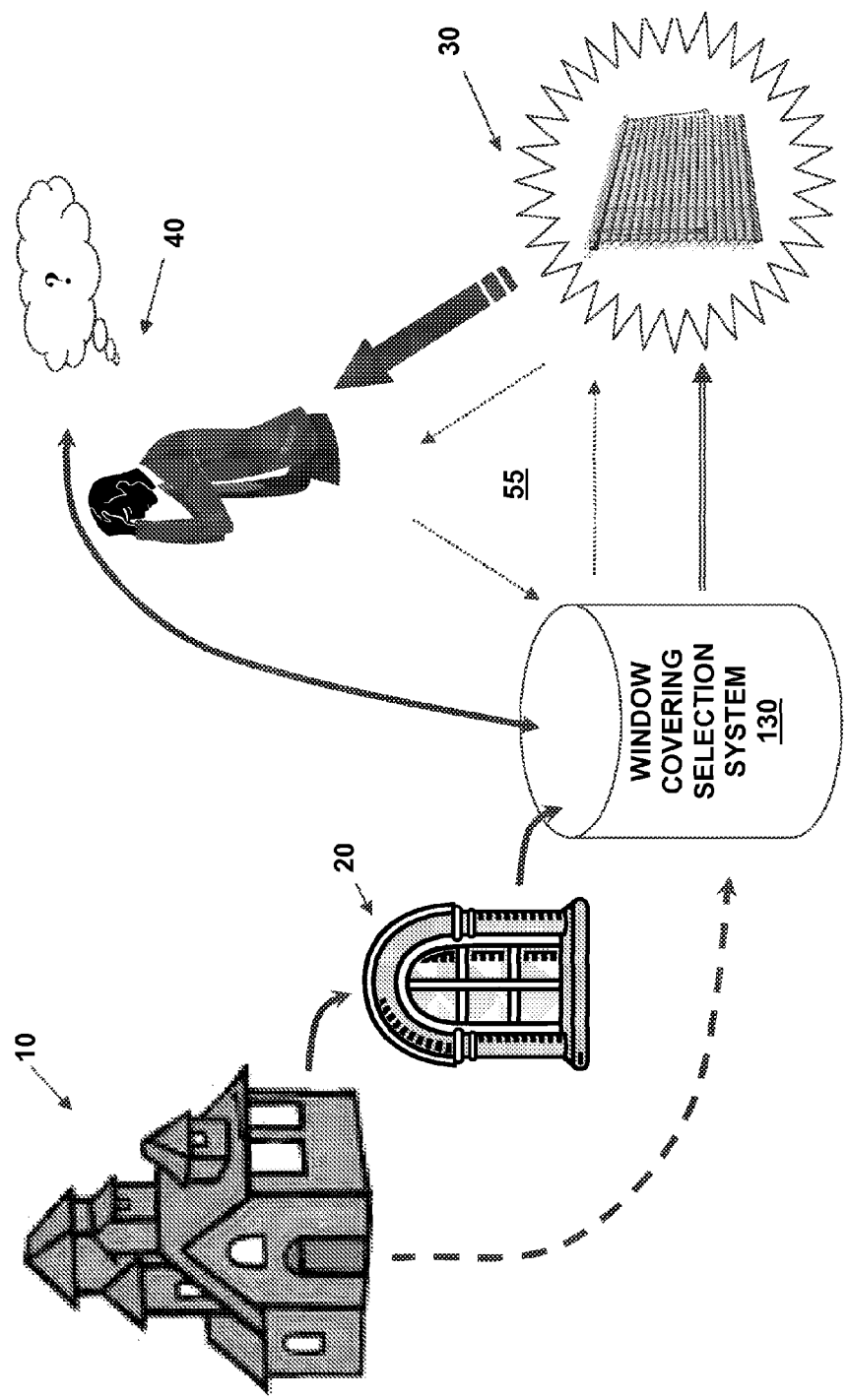
FIG. 1 depicts a schematic diagram of an illustrative process in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Aspects of the present invention include providing a solution for improving generally the selection of window coverings, and more specifically, a method, system, and program product for selecting window coverings.

FIG. 1 depicts a schematic diagram of an illustrative process in accordance with an embodiment of the present invention. The process, or method, ultimately aids in selecting window coverings 30. The process includes a structure 10, a window covering selection system 130, owner information 40, a window attribute 20, and a window covering option 30.

The structure 10 may be any suitable structure that currently has, or will receive, at least one window which has at least one window attribute 20. The structure 10 may undergo a renovation, rehabilitation, a modification, and/or an addition. Contrastingly, the structure 10 may be a new or to-be-built structure 10. For example, the structure 10 may be an existing home, a custom home, a model home, a home built to specification (i.e., "spec home"), a commercial building, and/or a vehicle.

In any event, the window covering selection system 130 includes a system for storing various information or data (FIG. 6), including window data (e.g., at least one window attribute 20), window covering data (e.g., window covering option 30), owner data (e.g., owner information 40), and/or other data (e.g., structure 10 information and/or other information). The window covering selection system 130 receives at least one window attribute 20 of a structure 10. Various information (e.g., owner information 40) is obtained via an electronic medium. Based, at least in part, on the at least one window attribute 20 received, and the information (e.g., owner information 40) obtained, at least one window covering selection 30 is presented via an electronic medium. The electronic medium used for obtaining and presenting may be the same electronic medium, or different electronic mediums. For example, the obtaining may be accomplished at home via a website (e.g., electronic medium) while the presenting may be accomplished at a kiosk located at a window covering store (e.g., electronic medium). The electronic medium(s) employed under aspects of the invention may be same/different types and/or same/different locations. Optionally, a feedback loop 55 is featured which may enhance the process as discussed herein. The feedback loop 55 may include one, or more, additional presentings of the window covering option 30 by the window covering selection system 130 after owner review of a first window covering option 30. For example, the system 130, after first presenting at least one window covering option 30, may present a second (e.g., third, fourth, etc.) window covering option 30 based upon subsequent additional (e.g., second) owner information 40 obtained after the "first" presenting. Alternatively, window attribute(s) 20 and/or other information may be received that further adjusts the at least one window covering option 30. In this manner, the window covering selection system 130 allows for narrowing, broadening, and/or changing of the window covering option 30 presented.

Figure 2:
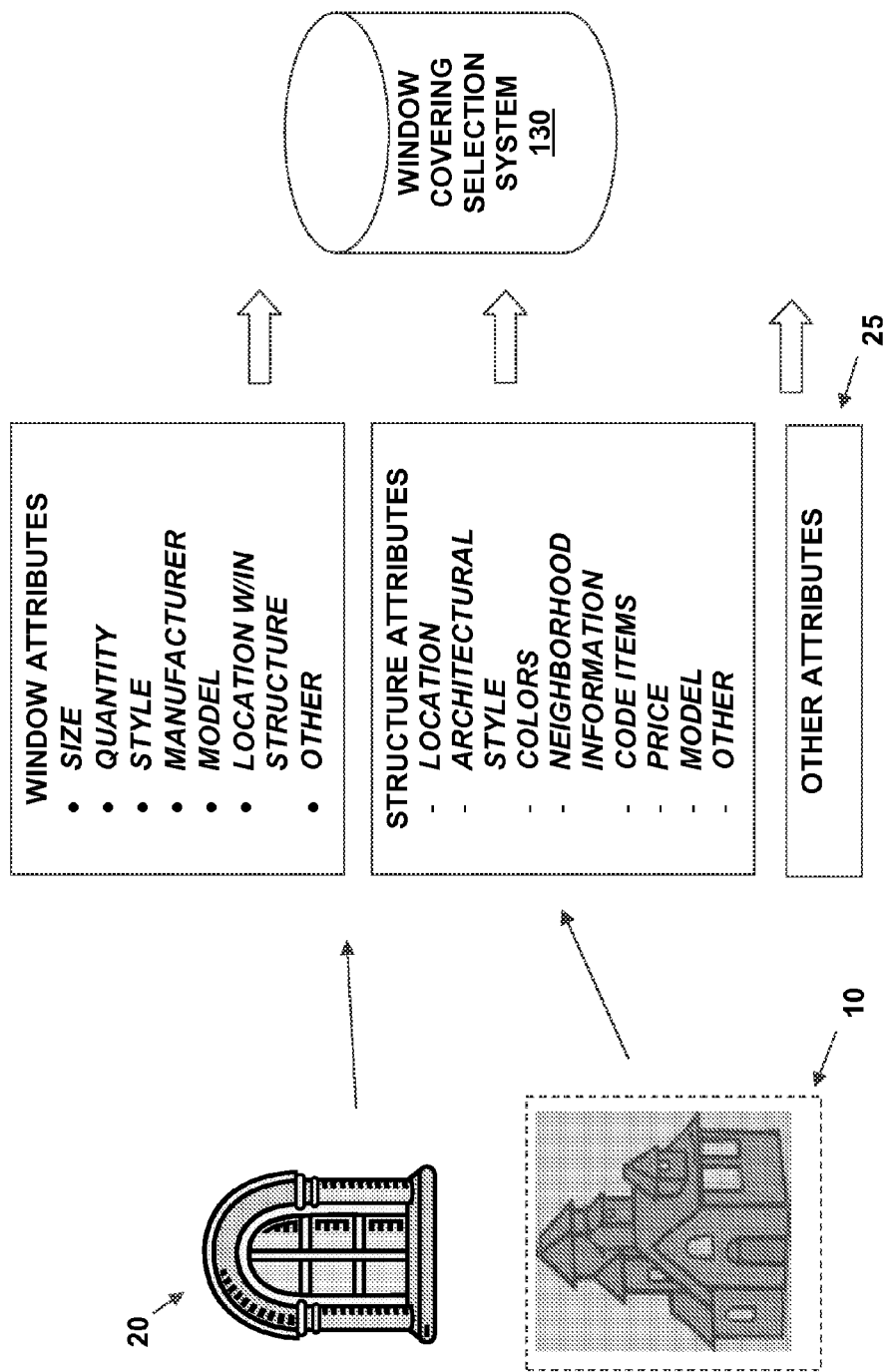
FIG. 2 depicts a window attribute and structure attribute portion of the schematic diagram of an illustrative process in accordance with an embodiment of the present invention.

Turning to FIG. 2 which provides a schematic diagram of the window attribute 20 portion of the invention, which is received in the window covering selection system 130. Window attributes 20 may include, for example, a window size/dimension, a window style, a window quantity, a window manufacturer, a window finish, a glazing construct, a window type, and/or the like. For example, the system 130 may receive information that for a given structure 10 there are four (4) windows total, wherein two (2) are manufactured by Anderson, aluminum clad in white, 2'×4', and wherein the other two (2) windows are manufactured by Pella, wood, primed, 3' wide, 6' tall, palladian-style, with low-E glazing having an anti-glare coating.

Optionally, the window covering selection system 130 may receive a structure attribute 10, and/or other attributes 25 such as a community attribute, a demographic, etc. Structure attributes 10 may include, for example, an attribute of the particular room that a particular window is located (e.g., function of room, orientation of room, color of walls, color of floor, location of furnishings, etc.), the architectural style of the structure 10 (e.g., Greek revival, modern, Spanish revival, arts and crafts, duplex, etc.), where the window is located within the room (e.g., southern facing, 2 feet from ceiling, etc.), the orientation of the structure (e.g., south facing, north side facing spectacular ocean view, etc.), and/or the like. In any event, the window covering selection system 130 receives, and may store, various information and data related to the structure 10, the windows 20, and/or the like.

The at least one window attribute 20, the structure attributes 10, and/or any other attributes 25 may be received by the window covering system 130 in any manner. The attributes 10, 20, 25 may be automatically loaded via an electronic system, manually entered by an entity, and/or the like. For example, for a project that has a structure 10 that is an existing house with pre-existing windows, wherein the owner desires to purchase and install new window coverings 30, then the at least one window attribute 20 may be manually entered into the window covering selection system 130 by the homeowner. Conversely, for example, for a project that has a particular model home for the structure 10 in a development being constructed by a builder, the at least one window attribute 20 may be automatically obtained via existing electronic data (e.g., material specification list, computer aided design (CAD) drawings, etc.) in the possession of the builder.

Figure 3:
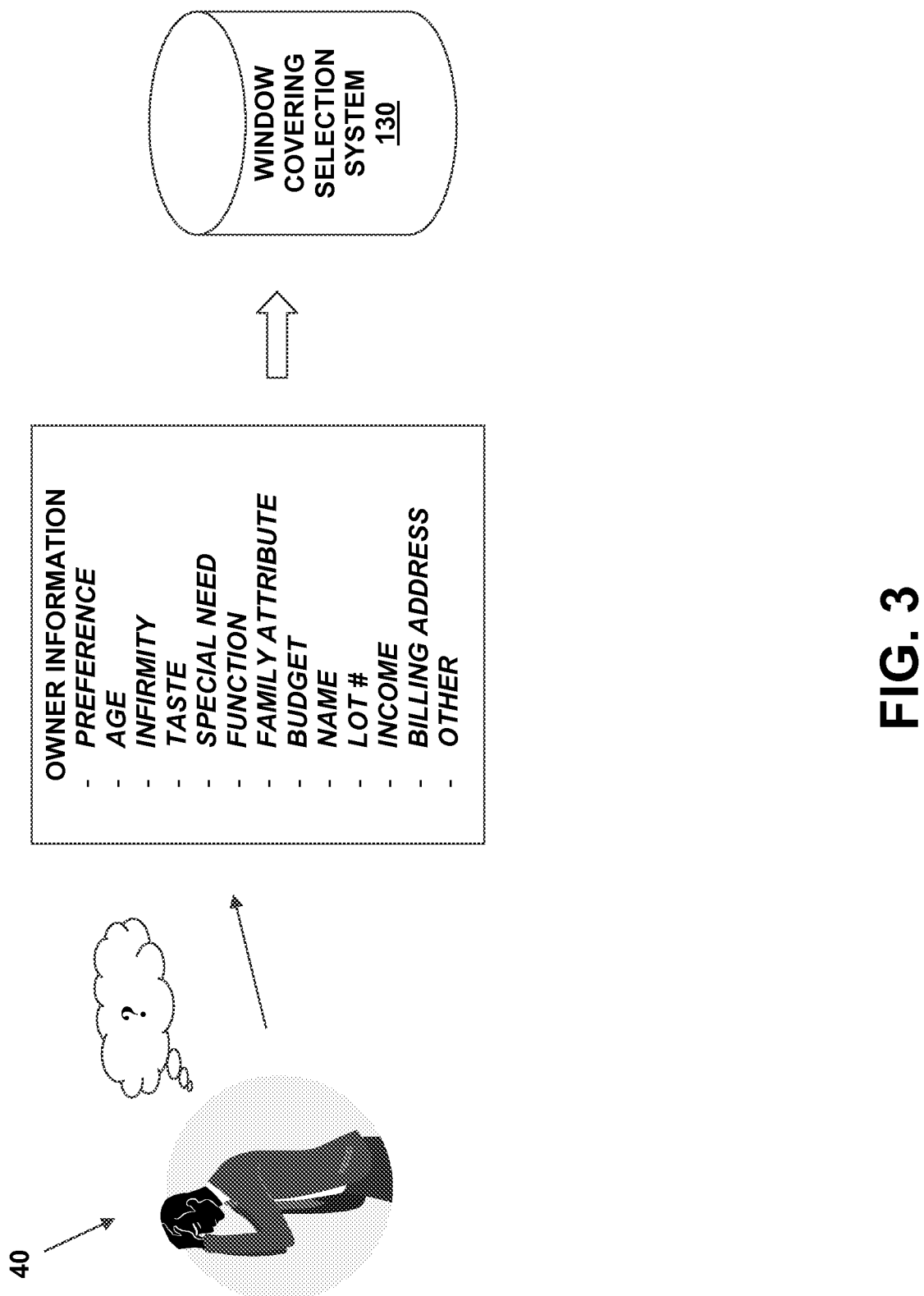
FIG. 3 depicts an owner information portion of the schematic diagram of an illustrative process in accordance with an embodiment of the present invention.
Figure 4:
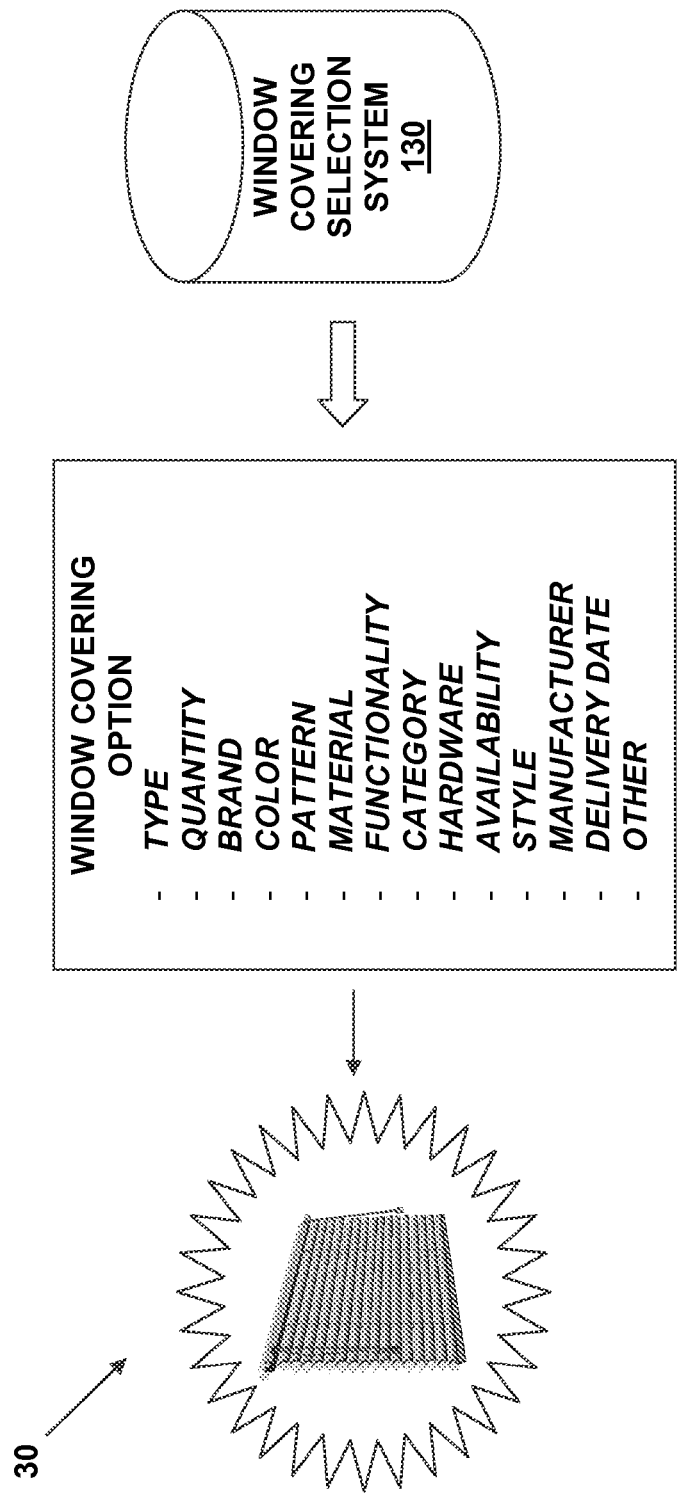
FIG. 4 depicts a window covering option portion of the schematic diagram of an illustrative process in accordance with an embodiment of the present invention.

FIG. 3 provides a schematic diagram of the owner information 40 that is obtained via an electronic medium. The owner information 40 may aid in providing an owner-tailored, customized window covering option 30 and selection therefrom. The owner information 40 may include any information that allows the window covering selection system 130 to filter the stored window covering data when subsequently presenting a window covering option 30 (FIG. 4). The owner information may, for example, include a budget for window coverings, income range, address, lot number, family information, preferences, and/or the like. The budget, for example, may be the total budget for the construction project, budget for each window, budget for total window covering costs, budget for each window covering, and/or the like. Family information may include age, infirmity, handicap, tastes, preferences, etc., for each family member. For example, it may prove germane in window covering selection to know that a family member is a toddler, because pull-cords on window coverings are generally not desirable in rooms where a toddler may be. Preferences may aid in determining style, color, fashion, or aesthetic preferences. Another example could be that the owner prefers two inch venetian blinds made of wood over other types of venetian blinds.

The owner information 40 may be obtained via an electronic medium. The electronic medium may be a graphical user interface (GUI) located on, for example, a kiosk, a personal computer (PC), a wireless device, a personal digital assistant (PDA), and/or the like. As with the attributes 20, 25 the owner information 40 may be automatically uploaded, manually entered by an entity, and/or the like.

FIG. 4 provides a schematic diagram of the window covering option 30 that is presented via an electronic medium. The window covering option 30 is based on the received at least one window attribute 20 and the obtained owner information 40. The window covering option 30 may be presented to include a filtering of at least a part of the window covering data (FIG. 6) based on the owner information 40 so that unnecessary and/or non-matching data is not presented. The window covering option 30 includes, for example, a type, a model, a quantity, a color, a style, hardware, a category, a functionality, an availability, a manufacturer, a delivery date, and/or the like. For example, type or category may include honeycomb, rollers, sunscreen, horizontal wood, synthetic wood, Roman, pleated, shutters, and/or the like. Similarly, hardware may include operation, standard lift systems, continuous cord, motorized, wand, etc.

Figure 5:
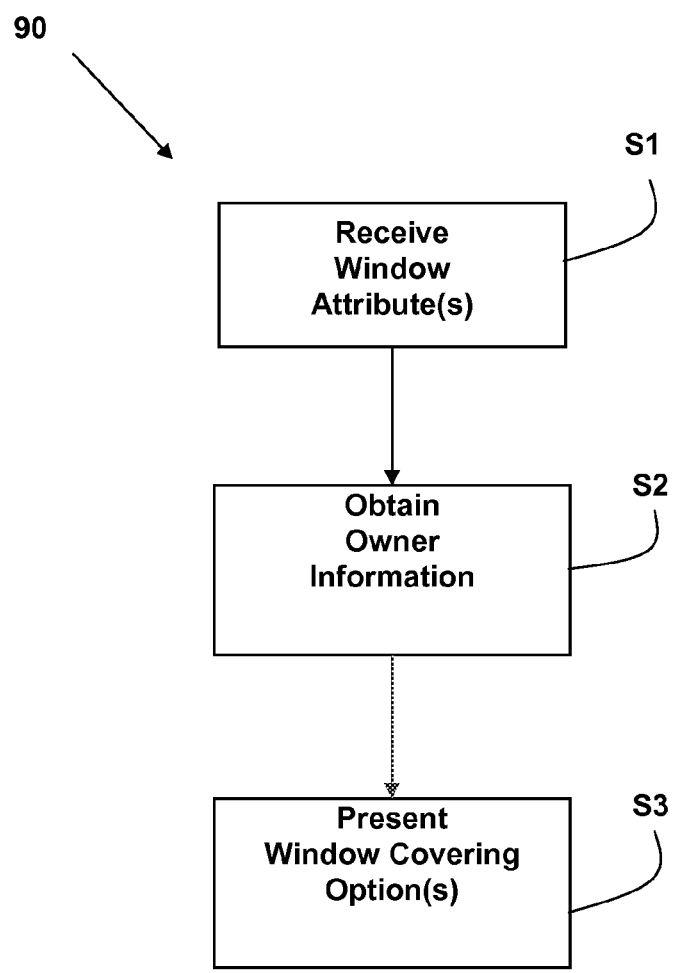
FIG. 5 depicts a flowchart of a method for selecting window coverings in accordance with an embodiment of the present invention.

FIG. 5 depicts a flowchart of a method for selecting window coverings. The method 90 begins with step S1, receiving at least one window attribute 20 as discussed herein. Step S2 follows and includes obtaining owner information 40. The method 90 concludes with step S3 of presenting at least one window covering option 30, wherein the option 30 is based on the at least one window attribute 20 and the owner information 40 obtained in steps S1 and S2.

Figure 6:
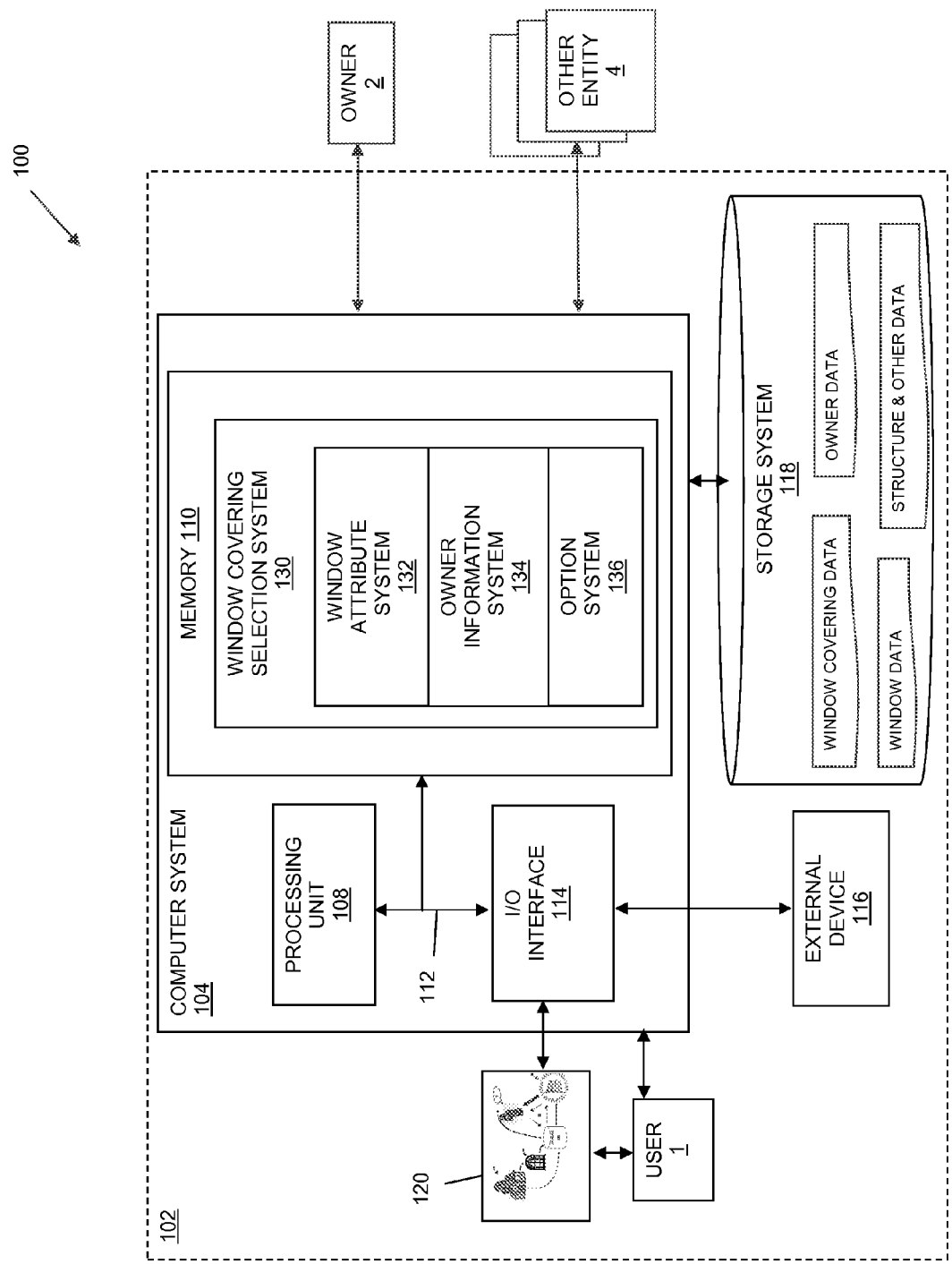
FIG. 6 depicts an illustrative system for implementing embodiment(s) of the present invention.

FIG. 6 depicts an illustrative system 100 in accordance with embodiment(s) of the present invention. The system 100 includes a computer infrastructure 102 that can perform the process described herein. The computer infrastructure 102 is shown including a computer system 104.

The computer system 104 is shown including a processing unit 108, a memory 110, at least one input/output (I/O) interface 114, and a bus 112. Further, the computer system 104 is shown in communication with at least one external device 116 and a storage system 118. In general, the processing unit 108 executes computer program code that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., GUI 120, wireless device, kiosk, personal digital assistant (PDA)) that enables a user 1 to interact with the computer system 104 or any device that enables the computer system 104 to communicate with one or more other computer systems. Computer system 104 may be in communication with a plurality of entities, including an owner 2 (e.g., owner of structure 10) and other entity 4. The other entity 4 may include, for example, a contractor (e.g., builder, contractor, construction manager, etc.), an architect, a designer (e.g., window covering designer, interior designer, etc.), a manufacturer (e.g., window covering manufacturer, window manufacturer, etc.), a supplier (e.g., window covering supplier, etc.), a real estate agent, a service provider, and/or the like.

In accordance with an embodiment of the present invention, the program code stored in the memory 110 comprises a window covering selection system 130 for providing a method of selecting window coverings as discussed herein. Provided as part of the window covering selection system 130 is a window attribute system 132 for receiving at least one window attribute of a structure; an owner information system 134 for obtaining a plurality of owner information; and, an option system 136 for presenting at least one window covering option, wherein the option is based on the at least one window attribute and the owner information. The operation carried out by each of these systems is described in greater detail herein.

The computer system 104 can comprise any general purpose computing article of manufacture capable of executing computer program code installed thereon (e.g., a personal computer, server, handheld device, etc.). However, it is understood that the computer system 104 and its various elements is only representative of various possible computer systems that may perform the processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 6 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in one embodiment, the invention provides a computer-readable medium that includes computer program code to enable a computer infrastructure to carry out and/or implement the process of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process of the invention on a subscription, advertising, and/or fee basis. A service provider can create, maintain, support, etc., a computer infrastructure, such as the computer infrastructure 102, that performs the process of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the process of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A computer-implemented method for selecting window coverings, comprising:
receiving at least one window attribute of a structure, wherein the at least one window attribute is selected from a group consisting of: a window size, a window style, and a window quantity;
obtaining a plurality of user information via an electronic medium, wherein the plurality of user information is selected from a group consisting: an age, an infirmity, a personal taste, a special need, a function, and a family attribute; and
presenting at least one window covering option via the electronic medium, wherein the option is based on the at least one window attribute and the plurality of user information.

2. The method of claim 1, wherein the obtaining is performed via a first electronic medium and the presenting is performed via a second electronic medium.

3. The method of claim 1, wherein the structure is selected from a group consisting of: a specification home, an existing home, a custom home, a commercial building, and a vehicle.

4. The method of claim 1, wherein the presenting further comprises:
providing the at least one window covering option for display on a graphical user interface (GUI).

5. The method of claim 4, wherein providing further includes providing the graphical user interface (GUI) on a device selected from a group consisting of: a wireless device, a personal digital assistant (PDA), and a kiosk.

6. The method of claim 1, where the receiving further comprises receiving at least one attribute selected from a group consisting of: a room attribute, a structure attribute, a community attribute, a demographic, and a structure location.

7. The method of claim 1, wherein the presenting includes providing pricing for the at least one window covering selection.

8. The method of claim 1, wherein at least one of the receiving, obtaining and presenting is provided at a kiosk.

9. The method of claim 1, wherein the at least one window covering option includes window covering information selected from a group consisting of: a type, a model, a quantity, a color, a style, an availability, a manufacturer, and a delivery date.

10. The method of claim 1, further comprising:
receiving a selection, based on the at least one window covering option; and
placing an order, based on the selection.

11. The method of claim 10, further comprising communicating one of the receiving the selection and the placing the order to at least one of: a builder, a supplier, a service provider, a window covering manufacturer, an architect, a window covering designer, and an interior designer.

12. The method of claim 1, wherein the presenting the at least one window covering option includes filtering at least one window covering option based on the plurality of user information.

13. The method of claim 1, further comprising storing in a database at least one of:
the at least one window attribute of a structure;
the plurality of user information; and
the at least one window covering option.

14. The method of claim 1, wherein the receiving includes a user inputting the at least one window attribute of a structure.

15. A system for selecting window coverings, comprising:
at least one computing device including:
a receiving system configured to receive at least one window attribute of a structure, wherein the at least one window attribute is selected from a group consisting of: a window size, a window style, and a window quantity;
an obtaining system configured to obtain a plurality of user information via an electronic medium, wherein the plurality of user information is selected from a group consisting: an age, an infirmity, a personal taste, a special need, a function, and a family attribute; and
a presenting system configured to present at least one window covering option via the electronic medium, wherein the option is based on the at least one window attribute and the plurality of user information.

16. The system of claim 15, wherein the obtaining system is included in a first computer system and the presenting system is included in a second computer system, distinct from the first computer system.

17. The system of claim 15, wherein the structure is selected from a group consisting of: a specification home, an existing home, a custom home, a commercial building, and a vehicle.

18. The system of claim 15, wherein the presenting system further comprises:
a display system for providing the at least one window covering option for display on a graphical user interface (GUI).

19. The system of claim 15, wherein the receiving system is further configured to receive at least one attribute selected from a group consisting of: a room attribute, a structure attribute, a community attribute, a demographic, and a structure location.

20. The system of claim 15, wherein the at least one window covering option includes window covering information selected from a group consisting of: a type, a model, a quantity, a color, a style, an availability, a manufacturer, and a delivery date.

21. The system of claim 15, further comprising:
a selection system configured to receive a selection, based on the at least one window covering option; and
an order system configured to place an order, based on the selection.

22. The system of claim 21, wherein at least one of the receiving system and the order system for placing are in communication with at least one of a builder, a supplier, a service provider, a window covering manufacturer, an architect, a window covering designer, and an interior designer.

23. The system of claim 15, wherein the presenting system includes a filtering system configured to filter for filtering at least one window covering option based on the plurality of user information.

24. A computer program stored on a computer-readable storage medium, which when executed, enables a computer system to provide a method for selecting window coverings, the computer program comprising program code for enabling the computer system to:
receive at least one window attribute of a structure, wherein the at least one window attribute is selected from a group consisting of: a window size, a window style, and a window quantity;
obtain a plurality of user information via an electronic medium, wherein the plurality of user information is selected from a group consisting: an age, an infirmity, a personal taste, a special need, a function, and a family attribute; and
present at least one window covering option via the electronic medium, wherein the option is based on the at least one window attribute and the plurality of user information.

25. A method for generating a system for selecting a window covering, the method comprising:
providing a computer infrastructure being operable to:
receive at least one window attribute of a structure, wherein the at least one window attribute is selected from a group consisting of: a window size, a window style, and a window quantity;
obtain a plurality of user information via an electronic medium, wherein the plurality of user information is selected from a group consisting: an age, an infirmity, a personal taste, a special need, a function, and a family attribute; and
present at least one window covering option via the electronic medium, wherein the option is based on the at least one window attribute and the plurality of user information.

* * * * *